Dec. 12, 1967    G. DOIG    3,357,162
PRESSURE REGULATOR FILTER DEVICE
Filed May 10, 1965
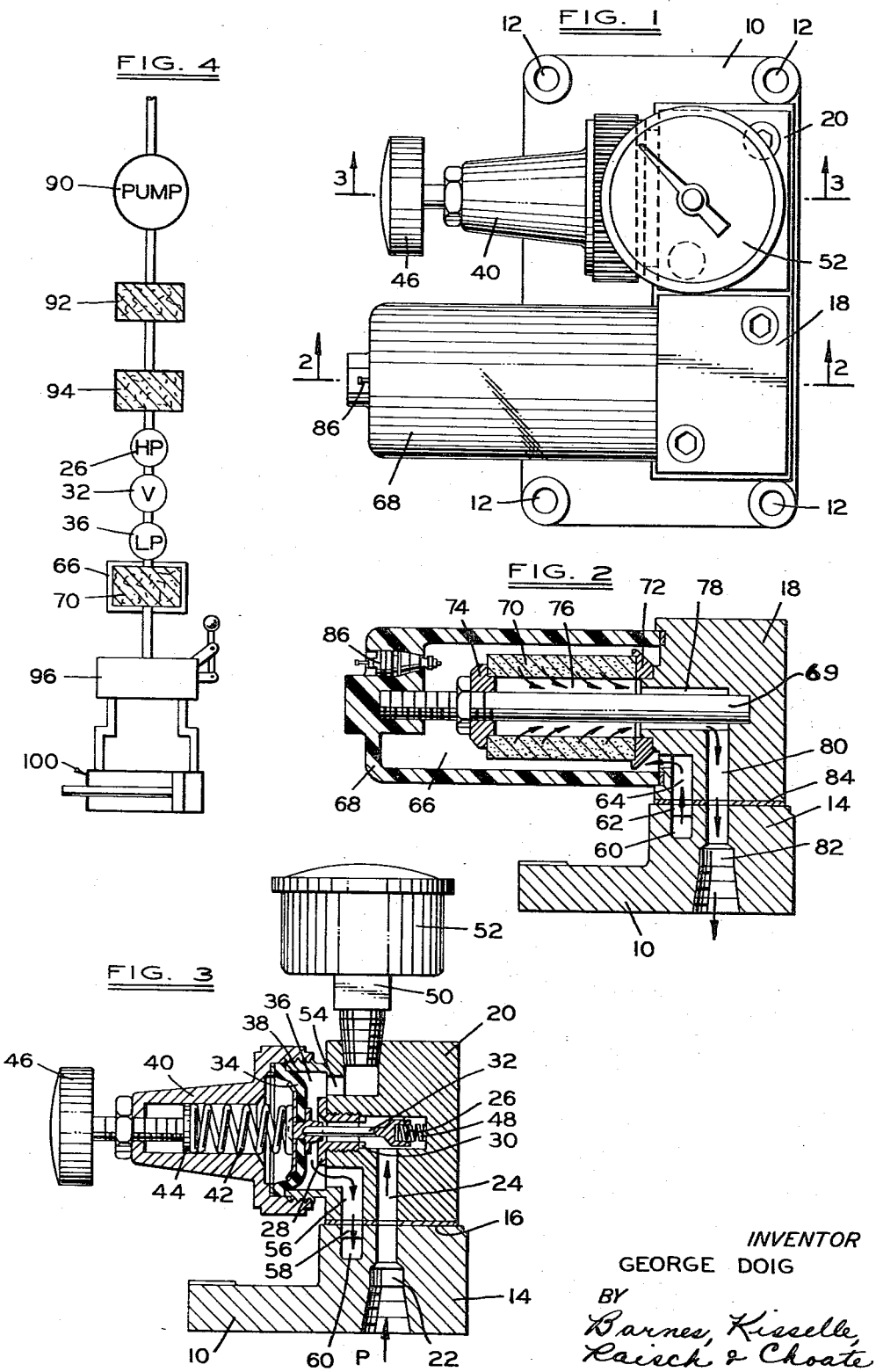
INVENTOR
GEORGE DOIG
BY
Barnes, Kisselle,
Raisch & Choate
ATTORNEYS

United States Patent Office 3,357,162
Patented Dec. 12, 1967

3,357,162
PRESSURE REGULATOR FILTER DEVICE
George Doig, Highland, Mich., assignor to Numatics, Incorporated, Highland, Mich., a corporation of Michigan
Filed May 10, 1965, Ser. No. 454,546
1 Claim. (Cl. 55—210)

This invention relates to a pressure regulator filter device.

It has been common for a number of years to utilize air pressure as a control fluid and with present day machinery the use of air control valves and motors is widespread in industry. In air systems of this kind, it has been the practice to filter the air going into the system in an attempt to remove as much entrained dirt as possible and to remove as much moisture and oil as is possible. It has also been common to utilize pressure regulators between the pressure source and the operating valves so that a reasonable standard level of pressure is available.

The common method has been to place a filter in the system ahead of the pressure regulator and then allow the air from the regulator to move into the operating system. In other systems, it has been common to use a so-called chemical drier or desiccant. These involve additional equipment and cost and also the necessity for frequent service. In the present device, it is proposed to provide a composite pressure regulator filter device which produces very clean, dry air mechanically without the use of a desiccant. The air is passed through a conventional primary filter which takes out the water droplets and the compressor oil droplets as well as any entrained dirt particles but despite the effectiveness of the filter it has been found that air so treated contains a certain amount of oil and vapor.

In the present invention, the air is passed through the regulator and in normal circumstances there is a reduction in pressure on the "out" side of the regulator. At this point, a filter is introduced. It has been found that the use of a filter at this stage produces a very significant reduction in the amount of water vapor in the air and this is believed to be due to the fact that as the air expands from the pressure regulator, there is a noticeable temperature drop. It is believed that this causes the water vapor to condense out in droplets which are picked up by the filter at this point. The same thing is happening to compressor oil fumes which also seem to filter out in a remarkable manner at this same point.

The object of the invention, therefore, is a pressure regulator filter system which removes an extraordinary amount of moisture and oil to provide a practically dry air which can be used in a valve system where moisture or oil droplets are a definite handicap, there being no need for lubrication and the moisture being apt to cause rusting or corrosion at undesirable points.

Other objects and features of the invention relating to details of construction and operation will be apparent in the following description and claim.

Drawings accompany the disclosure and the various views thereof may be briefly described as:

FIGURE 1, a top view of a pressure regulator filter assembly utilized for accomplishing the object of the invention.

FIGURE 2, a sectional view on line 2—2 of FIGURE 1.

FIGURE 3, a sectional view on line 3—3 of FIGURE 1.

FIGURE 4, a diagrammatic illustration of a circuit incorporating the principle of the invention.

Referring to the drawings:

In FIGURE 1, a mounting plate 10 has corner holes 12 to facilitate the mounting of the plate and a raised block-like platform 14 having a flat surface 16 serving as a mount for two assembly blocks 18 and 20 serving respectively as bases for a filter assembly and a pressure regulator assembly.

As shown in FIGURE 3, the pressure regulator assembly has entrance port 22 passing through the plate 10 and block 14 into an inlet passage 24 in block 20, this passage leading to a valve bore 26 into which is threaded a valve seat nipple 28 having at the bottom thereof a seat 30 which is adapted to cooperate with a stem valve 32 mounted on a diaphragm 34 in a chamber 36 formed by a threaded annular flange 38. A pressure regulator cap 40 has an annular portion which threads over the flange 38 to clamp the annular edges of the diaphragm 34, this cap 40 containing a spring 42 bearing against the diaphragm, adjustable in its pressure through a screw plate 44 actuated by a knob 46. The valve 32 is also backed by a spring 48 in bore 26. Mounted in the block 20 is the stem 50 of a pressure indicator 52 which connects through a passage 54 to the chamber 36. A passage 56 in hte block 20 angles from the chamber 36 to the bottom of block 20 where it enters a passage 58 leading to a cross-passage 60 extending longitudinally of the block 14 to a rising passage 62 (FIGURE 2) connecting to a passage 64 in block 18 leading to an expansion chamber 66 formed by a dome-like member 68 mounted on a supporting stem 69 anchored in the block 18 and projecting at right angles thereto. The dome 68 is preferably transparent so that the interior of the device may be observed.

Mounted around the stem 69 is a cylindrical filter element of standard construction retained in a seat 72 on the block 18 by a retaining ring 74 around the stem. Air passing through the filter cylinder 70 will reach the interior chamber 76 where it can pass through a central bore 78 around the stem 69 to a transverse passage 80 leading to an outlet port 82 in the block 14 and plate 10. It is important that the filter chamber be located as close to the pressure regulator as possible to take full advantage of the expansion effect of the regulator on the moisture and oil in the passing air.

In the operation of the device, air under pressure from the compressor entering port 22 will pass through the bore 24 into the bore 26 where it will be stopped unless the pressure in chamber 36 is below a certain regulated point. When pressure in chamber 36 reduces to this point, pressure from the source will pass through chamber 36 to the outlet passages 56 and 58 and cross passage 60 leading to the expansion chamber 66 of the filter through passages 62 and 64. The expanded air will lose entrained and condensed droplets of moisture and oil in the chamber 66 as it is filtered through the cylindrical cartridge 70 and the purified dry air will pass to the chamber 76 and to the outlet 82 in the block 14.

A suitable gasket seat 84 is interposed between the block platform 14 and the two blocks 18 and 20 to seal the various passages. Also in the end of the filter dome 68 is a manually operable drain valve 86 for bleeding the dome of accumulated moisture and oil.

The circuit of the above device is shown diagrammatically in FIGURE 4 where the pressure source 90 supplies air to primary filters 92 and 94 and then to the high pressure chamber 26 of the valve 32. From here the air goes into the low pressure chamber 36 and then to the filter chamber 66 and filter element 70. Beyond this point the air will go to a control valve 96 where it may be directed selectively to a piston-cylinder motor 100.

As indicated above, it is important for best results that the filter chamber 66 be as close to the pressure regulator outlet as possible. The structure of FIGURES 1 to 3 illustrates the manner in which this can be accomplished.

What is claimed as new is as follows:

In a pneumatic system including a pressure source and a pneumatically operated device, the pressure at the source being higher than that intended for use at the operating device, that improvement which comprises:

(a) a mounting plate having a raised platform providing a surface for mounting thereon a pressure regulator and an expansion and filter device, said mounting plate and said platform having an entrance port and an outlet port passing therethrough with both of said ports opening onto said mounting surface;

(b) a pressure regulator mounted on said surface and having an inlet passage and an outlet passage, said inlet passage being connected with said entrance port;

(c) and an expansion and filter device mounted on said surface adjacent said pressure regulator, said device comprising a base; a dome-like member mounted on said base providing an expansion chamber; a cylindrical filter element mounted on said base and within said chamber and spaced from said dome-like member; and common means for mounting both said dome-like member and said filter element on said base, said base having a bore connecting the interior of said filter element with said outlet port, said mounting plate and said platform having a cross-passage extending from said pressure regulator to said base, one end of said cross-passage being connected with said pressure regulator outlet passage, said base having a passage connecting said chamber exterior of said filter element with the other end of said cross-passage, wherein a pressure source connection and a connection to said operating device respectively at the entrance and outlet ports of said mounting plate will place said pressure regulator and said expansion and filter device in series between said entrance and outlet connections.

References Cited
UNITED STATES PATENTS

| | | | |
|---|---|---|---|
| 1,225,533 | 2/1918 | Heinrich | 55—319 |
| 1,458,005 | 6/1923 | Rohrer | 55—319 |

HARRY B. THORNTON, *Primary Examiner.*

S. W. SOKOLOFF, *Assistant Examiner.*